May 14, 1929. J. A. WRIGHT 1,712,540
REAR AXLE ASSEMBLY
Filed April 11, 1927 2 Sheets-Sheet 1

Inventor
James A. Wright
By
Attorney

May 14, 1929.    J. A. WRIGHT    1,712,540
REAR AXLE ASSEMBLY
Filed April 11, 1927    2 Sheets-Sheet 2

INVENTOR.
JAMES A. WRIGHT.
By

ATTORNEY.

Patented May 14, 1929.

1,712,540

UNITED STATES PATENT OFFICE.

JAMES A. WRIGHT, OF MONTREAL, QUEBEC, CANADA.

REAR-AXLE ASSEMBLY.

Application filed April 11, 1927. Serial No. 182,912.

This invention relates to the rear axle assembly of motor vehicles, in which individual wheel action is obtained by transverse spring suspension.

The object of this invention is to provide a rear axle assembly for motor vehicles in which the unsprung weight is reduced to a minimum, and the individual wheel action is obtained by a system of parallel springs, radius rods and driving shafts between the differential casing and the load plane of the wheel. By means of this system the wheels are maintained in their true position and can only move vertically on the radius of their connections with the chassis frame. The arrangement of these connections is such that all torsional and other stresses from all directions are fully absorbed without displacing the wheel.

A further object is to provide wheel carriers which support the driving shaft universal joint, the spring terminals and the radius rod pivots in the load plane of the wheels.

Further objects will be set forth in the specification hereinafter.

Reference is made to the accompanying drawings in which

Figure 1:
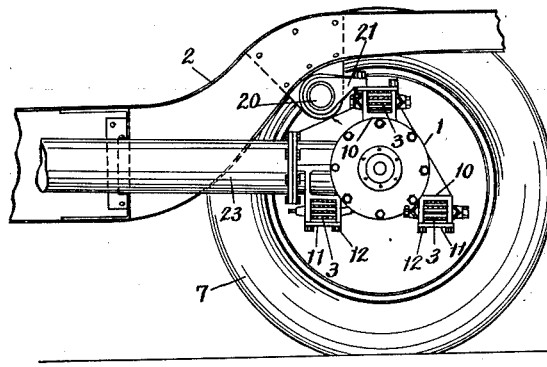
Figure 1 is a side view of the central mounting.
Figure 2:
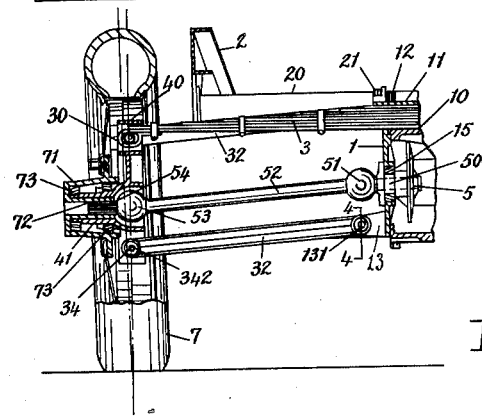
Figure 2 is a vertical cross section of one half of the assembly.
Figure 6:
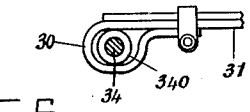
Figure 6 is an enlarged view of the end of the spring.
Figure 5:
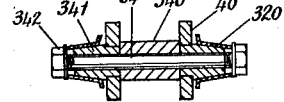
Figure 5 is a cross section on the line 5—5 of Figure 3.
Figure 3:
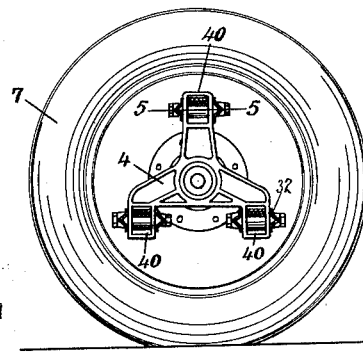
Figure 3 is a side view of the wheel and wheel carrier.
Figure 4:
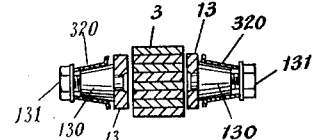
Figure 4 is a cross section on the line 4—4 of Figure 2.
Figure 8:
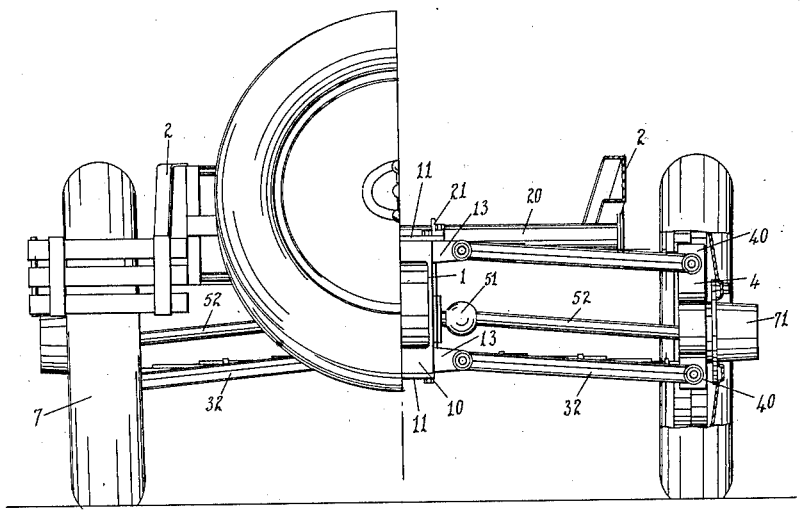
Figure 8 is a rear view.
Figure 7:
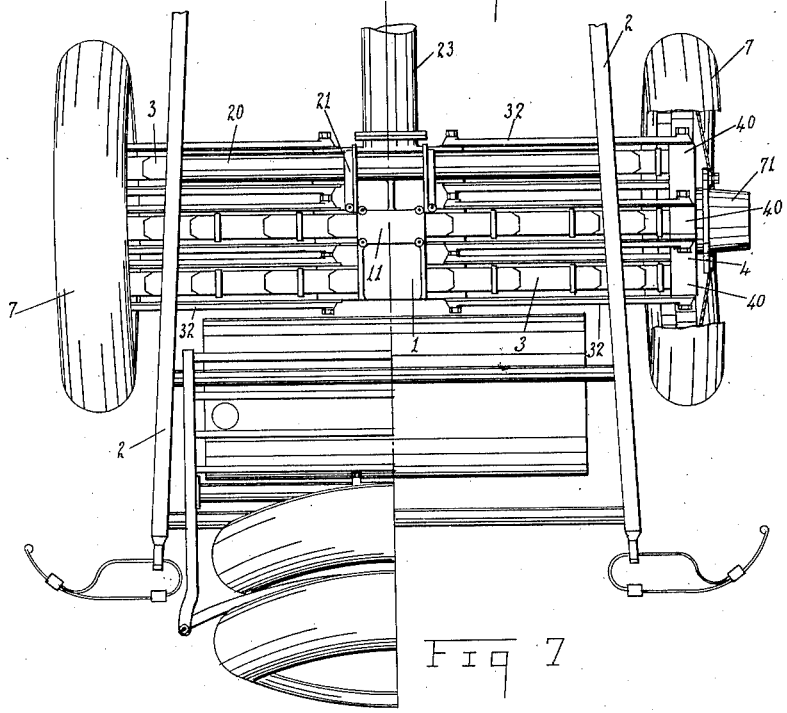
Figure 7 is a plan view.

The differential casing 1 which is secured to the frame 2 by brackets 21 on the transverse tube 20 and to the end of the torque tube 23, is provided with seats 10 in which the transverse springs 3 are secured by the anchor plates 11 through the bolts 12. The sides of the spring seats 10 extend outwardly to provide bearing brackets 13 for the radius rods 32. These radius rods 32 are preferably V section steel stampings with conical ends 320, which are mounted on conical bearings 130 and 341, to be referred to later.

The wheels 7 which are of the disc type, have outwardly extending hubs 71 with inwardly projecting stub shafts 72.

The wheel carriers 4 consist of inverted Y shaped ribbed castings with terminal bearings 40 for the looped ends 30 of the springs 3, and a central sleeve extension 41, in which the stub shaft 72 rotates. Roller bearings 73 are mounted between the sleeves 41 and the hub 71.

The shaft 50 of the differential 5 is journalled in roller bearings 15 in the side of the casing 1 and is coupled by a universal joint 51 to the shaft 52, in the plane of the bearings 130 of the radius rods 32. The shaft 52 is coupled by a universal joint 53 in the load plane of the wheel, to a splined stub spindle 54, which meshes with the stub shaft 72 of the hub 71 and provides the driving power to the wheel.

The ends of the springs 3 have elongated loops 30 which are formed in the lower leaf 31 of the spring 3, and are mounted in the bearings 40 of the wheel carrier 4, on sleeves 340 on the bolts 34. These bolts 34 also carry conical bearings 341 on which the conical ends 320 of the radius rods 32 are journalled and secured by the nuts 342. The other conical ends 320 of the radius rods 32 are secured on the conical bearings 130 by the nuts 131. A slight camber may be given to the wheels without affecting the mode of operation.

With this type of construction, it will be seen that the springs are secured to the casing the whole of its width and each half spring is independent in its action. The springs transfer their load to the wheels in the load plane of the wheels, as far as possible from the central line of the chassis. By this means the springs assist the tires in absorbing the road shocks without transferring them to the chassis.

The arrangement of the three springs with radius rods on both sides of each of them, and the intermediate driving shaft all spaced apart and in parallel, the rigid members being of the same length and being pivoted at their ends in two parallel vertical planes, provides a very substantial resistance to all torsional or other stresses in any direction but vertical, and the latter are absorbed by the springs and the tire.

The driving power is transmitted from the differential to the wheel without loss or strain on the mechanism.

The elongated spring loops permit free action of the springs without affecting the wheel carriers.

The radius rods prevent any lateral movement of the springs or of their leaves.

The only unsprung weight is supported directly in the load plane of the wheel.

The wheels are maintained at all times in their true position in relation to the chassis by a plurality of parallel connections which enable the springs to function with the greatest efficiency.

I claim:

1. In a rear axle assembly, transverse springs mounted on the differential casing, having their ends journalled in bearings on wheel carriers in the load plane of the wheels, radius rods pivoted on brackets from the side of the casing, and on the bearings of the wheel carriers in the said plane, with driving shafts from the differential to the wheel having universal joints in the said plane and in the plane of the bracket bearings of the radius rods.

2. In a rear axle assembly, transverse springs mounted on the differential casing, having their ends journalled on wheel carriers in the load plane of the wheels, radius rods at each side of the springs, pivoted to brackets on the side of the casing and to the wheel carriers in the said plane, with driving shafts having universal joints, one in the said plane and the other in the plane of the bracket bearings of the radius rods.

3. In a rear axle assembly, transverse springs securely mounted on the differential casing, disc wheels journalled on wheel carriers within the wheels, terminal bearings spaced apart on the wheel carriers, the ends of the springs journalled in the terminal bearings, radius rods on each side of the springs, pivoted to the terminal bearings and to brackets on the side of the casing, with a driving shaft, of which the portion between the universal joints is of equal length and is parallel to the radius rods.

4. In a rear axle assembly the combination of a differential casing having parallel spring U shaped seats, three semi-elliptic transverse springs mounted in the seats, bearing brackets from the casing on each side of the springs, with disc wheels, hubs having tubular stub axles, an inverted Y shaped wheel carrier having terminal spring bearings and an outwardly extending sleeve mounted on the stub axles, the spring bearings in the central load plane of the wheels having sleeved pins on which the elongated spring eyes are mounted, and radius rods on each side of the springs pivoted to the bearing brackets and to the spring bearings, driving shafts on each side of the differential having Cardan shafts with universal joints, in the planes of the radius rod pivots and splined in the stub axles.

5. In a transverse spring rear axle assembly, disc wheels journalled on wheel carriers within the wheels, terminal bearings spaced apart on the wheel carriers, a differential casing having spring seats and terminal bearings, the wheel carriers and differential casing connected by units consisting of a spring seated in the differential casing and pivoted on the wheel carrier terminal bearing, and a pair of light radius rods, one on either side of the spring, and pivoted to the terminal bearings, and a drive shaft having universal joints in the vertical plane of the said terminal bearings.

6. In a transverse spring rear axle assembly, disc wheels journalled on wheel carriers within the wheels, terminal bearings spaced apart on the wheel carriers, consisting of box castings and a bearing bolt therethrough, a differential casing having spring seats and terminal bearings, the wheel carriers and differential casing connected by units consisting of a spring seated in the differential casing and pivoted on the wheel carrier terminal bearing within the box casting, and a pair of light radius rods, one on either side of the spring, and pivoted to the terminal bearings, and a drive shaft having universal joints in the vertical plane of the said terminal bearings.

7. In a transverse spring rear axle assembly, disc wheels journalled on wheel carriers within the wheels, terminal bearings spaced apart on the wheel carriers, a differential casing having spring seats and terminal bearings, the wheel carriers and differential casing connected by units consisting of a spring seated in the differential casing and pivoted on the wheel carrier terminal bearing and a pair of light radius rods, one on either side of the spring, parallel to and on the same horizontal plane, and pivoted to the terminal bearings, and a drive shaft centrally between the units, having universal joints in the vertical plane of the said terminal bearings.

JAMES A. WRIGHT.